(No Model.)

G. H. LOMAX.
MANUFACTURE OF GLASS LAMPS.

No. 288,715.  Patented Nov. 20, 1883.

Witnesses
J. N. Piper
E. B. Pratt

Inventor
George Henry Lomax
by R. H. Eddy atty.

UNITED STATES PATENT OFFICE.

GEORGE HENRY LOMAX, OF SOMERVILLE, MASSACHUSETTS.

MANUFACTURE OF GLASS LAMPS.

SPECIFICATION forming part of Letters Patent No. 288,715, dated November 20, 1883.

Application filed August 31, 1883. (No model.)

*To all whom it may concern:*

Be it known that I, GEORGE HENRY LOMAX, of Somerville, in the county of Middlesex, of the Commonwealth of Massachusetts, have invented a new and useful Improvement in the Manufacture of Glass Lamps; and I do hereby declare the same to be described in the following specification and represented in the accompanying drawings, of which—

Figure 1:
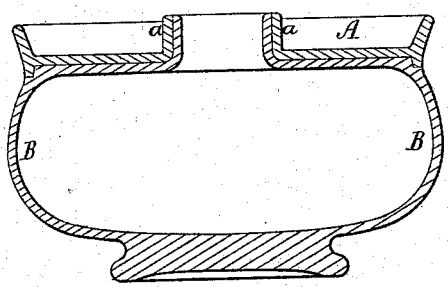
Figure 2:
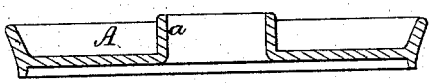
Figure 3:
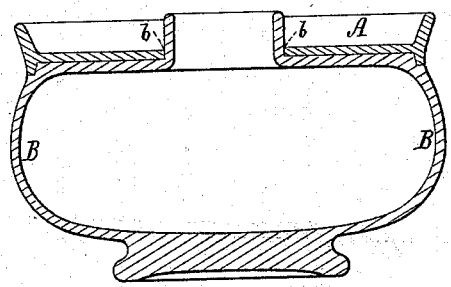
Figure 4:
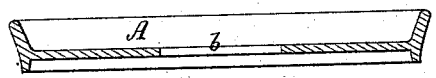

Figure 1 is a vertical section of a lamp made in accordance with my invention, the nature of which is defined in the claim hereinafter presented. Fig. 2 is a transverse section of a necked saucer, to be described, as constituting part of my improved lamp. Fig. 3 is a transverse section of a lamp of my improved kind as made with its saucer constructed with a hole through it instead of a neck, the latter being formed wholly on the body. Fig. 4 is a section of a saucer as made with the central hole.

In the common process usually heretofore practiced for making a glass lamp with a lip extending upward from it and around or concentrically to the neck of such lamp, it is customary to press the body in the form of a cup, with the lip extending from it below its upper edge and at right angles with the body. The said body is afterward heated and closed in, so as to form the neck, and have the lip to project upward from the body, the said lip being to intercept oil and prevent it from running down on and dropping off the body when the lamp may be in use. This mode of making the lamp is much more expensive than that hereinafter explained, as by the latter a lamp of the kind can be manufactured for about half the expense to what it can be produced by the method above explained.

In carrying out my present invention I construct the lamp in two parts—viz., the "saucer" A and the "body" B—as shown in section in the drawings. The saucer or upper part of the lamp I form by casting or pressing a mass of glass into a proper mold for its production, such saucer at its central part being formed or provided with a hole, *b*, as shown in Figs. 3 and 4, or with a tubular neck, *a*, to extend from it in manner as represented in Figs. 1 and 2. Having thus made the saucer, I place it in a sufficiently-heated state within a body-mold, and having upon the end of a blow iron or tube a sufficient amount of glass in a molten state for the formation of the body B, I insert such mass within the mold and blow through the iron or tube into the mass and expand such mass fully into the mold and against the saucer, so as to extend entirely across the latter and into the neck or hole, in manner as represented in Figs. 1 and 3 of the drawings, the glass so blown into the body uniting with the saucer, so as to constitute therewith a lamp. The foot is subsequently closed in to complete the body. In the lamp shown in Fig. 3 the neck extends up through and above the hole of the saucer.

I do not claim a hollow article of glassware composed of pressed sections united by means of offsets formed in the receiving-sections, substantially and for the purpose as described in the United States Patent No. 181,618.

I claim—

As a new or improved manufacture, a glass lamp consisting of a pressed-glass necked saucer, A, and a blown-glass body, B, made, arranged, and combined substantially as set forth.

GEORGE HENRY LOMAX.

Witnesses:
R. H. EDDY,
E. B. PRATT.